J. W. NELSON.
SIGHT GLASS FOR ROUTING MACHINES.
APPLICATION FILED OCT. 12, 1914.
1,148,397.
Patented July 27, 1915.
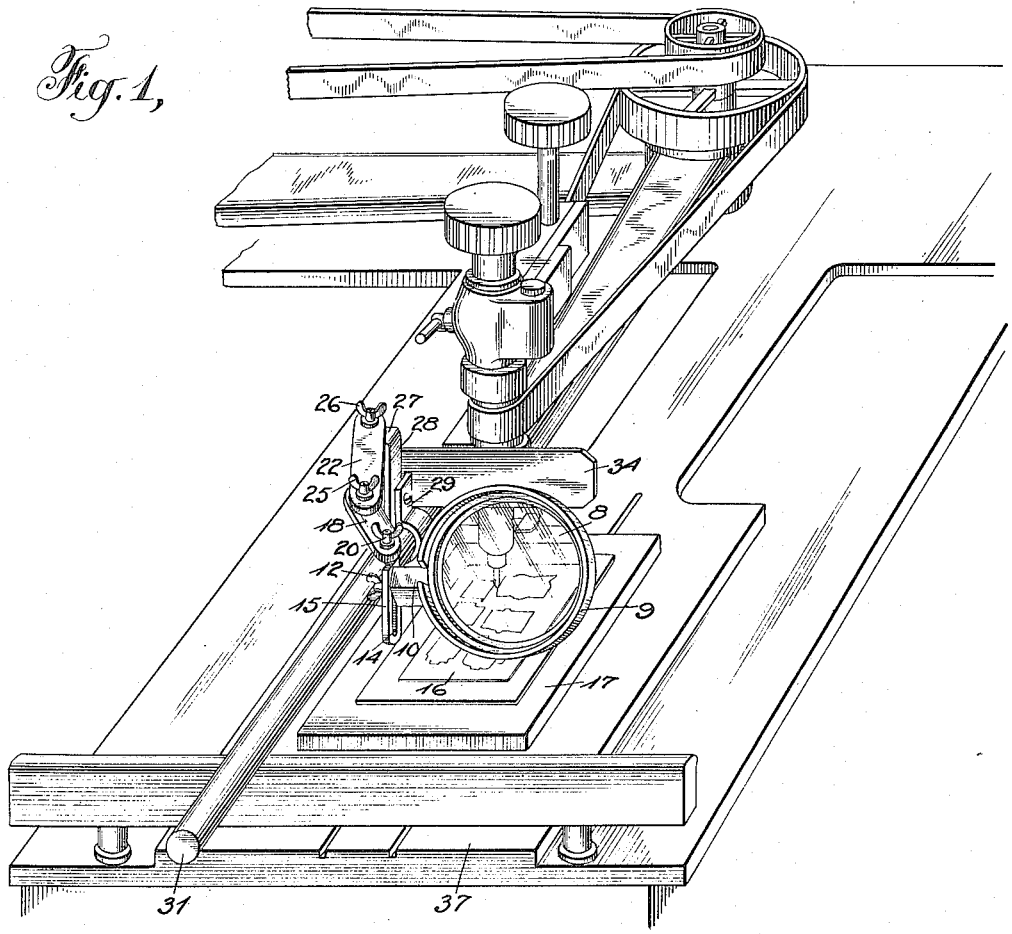
Fig. 1,
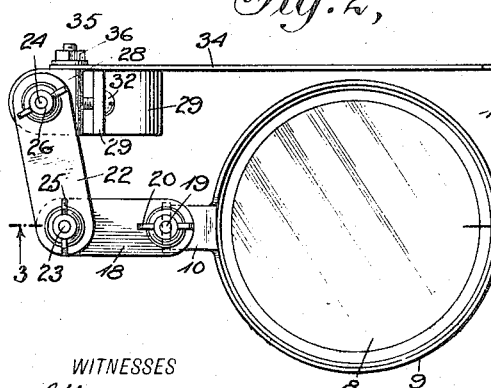
Fig. 2,
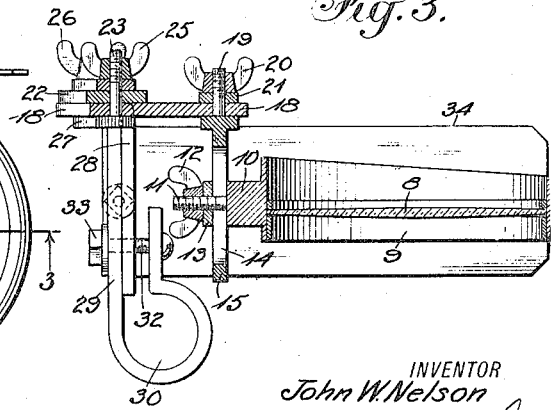
Fig. 3.
WITNESSES
L. Hauerstein
C. F. Mullock
INVENTOR
John W. Nelson
BY Munn & Co.
ATTORNEYS

UNITED STATES PATENT OFFICE.

JOHN W. NELSON, OF NEW YORK, N. Y.

SIGHT-GLASS FOR ROUTING-MACHINES.

1,148,397. Specification of Letters Patent. Patented July 27, 1915.

Application filed October 12, 1914. Serial No. 366,273.

*To all whom it may concern:*

Be it known that I, JOHN W. NELSON, a citizen of the United States, and a resident of New York city, borough of Brooklyn, in the county of Kings and State of New York, have invented a new and Improved Sight-Glass for Routing-Machines, of which the following is a full, clear, and exact description.

Among the principal objects which the present invention has in view are: to provide a magnifying glass and an adjustable holding mechanism therefor, arranged to permit the operator to guide a relatively small cutting tool with greater accuracy; to provide means to prevent the flying of dangerous particles cut from the work being executed; and to provide means for augmenting the area of operation of the magnifying member.

*Drawings.*—Figure 1 is a perspective view, showing the cutting head of a routing machine, having applied thereto a sight glass constructed and arranged in accordance with the present invention; Fig. 2 is a detail view of a sight glass and support therefor, constructed and arranged in accordance with the present invention, the same being shown as attached to routing machine; and Fig. 3 is a section taken on the line 3—3 in Fig. 2.

*Description.*—As shown in the drawings, the glass 8 is mounted in a frame 9, from which extends a post 10. The post 10 has a threaded extension 11 to receive a wing nut 12 and a washer 13. The extension 11 passes through an elongated slot 14 in a vertical plate 15. The slot 14 and plate 15 are provided to permit the adjustment of the post 10 and the glass 8 mounted thereon to be adjusted vertically with reference to the work 16 on the bed plate 17.

The plate 15 is pivotally secured at the outer end of an articulated plate 18 by means of the screw post 19. The post 19 is provided with screw threads, as shown in Fig. 3 of the drawings, to receive a wing nut 20. The wing nut operating through a washer 21, is employed to bind the plate 15 non-rotatively to the plate 18. The plates 18 and 22 constitute an adjustable articulated structure, whereby the horizontal arrangement of the glass 8 may be varied to adjust the focal axis of the glass with the work under observation. The plates are pivotally connected by screw bolts 23 and 24.

The bolts 23 and 24 are provided with wing nuts 25 and 26 respectively. The bolt 24 is rigidly mounted in the horizontal extension 27 of the bracket plate 28. The plate 28 is reinforced by a plate 29, shaped at the lower end to form an eye or loop 30. The loop 30 in service is clamped to the guide arm 31 of a routing machine. The loop is contracted on the said arm by a screw bolt 32, which extends through suitable perforations in the end of the loop 30 and the plate 29 and is externally provided with a nut 33.

A light shield 34 is adjustably mounted on a stud bolt 35 and held in working position by a nut 36. When in service, the office of the shield 34 is to catch or stop any particles cut from the work 16. Grave inconvenience has heretofore been experienced in the work from the flying particles cut from the work by the routing tool.

When a routing machine is provided with a sight glass and mounting therefor, constructed and arranged as above described and as shown in the accompanying drawings, the operation is as follows:—The work 16 and bed plate 17 thereof having been clamped to the table 37, the nuts 20, 25 and 26 are preliminarily loosened to permit the plates 18 and 22 to swing freely in a horizontal plane. The nut 12 in the plate 15 is then loosened and the glass 8 is placed in focus with the cutting point of the routing tool. The various nuts 12, 20, 25 and 26 are then tightened, holding the plates 15, 18 and 22 rigidly positioned on the bracket plate 28. The adjustment between the glass 8 and the cutting point of the tool thereafter remains fixed.

The shield 34 is arranged to cover the upper edge of the sight glass 8 and to extend beyond the same in such manner as to obstruct the flight of particles cut or chipped from the work 16.

Claims:

1. An apparatus as characterized comprising, a magnifying glass; a holding frame therefor embodying a laterally extended screw-threaded post; a longitudinally-slotted vertically disposed plate to support said glass, frame and post connected therewith; a clamp nut mounted on said post to hold the same in fixed relation to said plate; a bracket plate adapted to be fixedly mounted on a routing machine to move therewith; a plurality of articulated plates operatively connecting said slotted plate and said bracket plate; and means for locking the said plates in fixed relation.

2. An apparatus as characterized comprising, a magnifying glass; a holding frame therefor embodying a laterally extended screw-threaded post; a longitudinally-slotted vertically disposed plate to support said glass, frame and post connected therewith; a clamp nut mounted on said post to hold the same in fixed relation to said plate; a bracket plate adapted to be fixedly mounted on a routing machine to move therewith; a plurality of articulated plates operatively connecting said slotted plate and said bracket plate; means for locking the said plates in fixed relation; and a shield fixedly mounted on said bracket plate to cover an area external to said glass and frame therefor.

3. An apparatus as characterized comprising, a magnifying glass; a holding frame therefor embodying a laterally extended screw-threaded post; a longitudinally-slotted vertically disposed plate to support said glass, frame and post connected therewith; a clamp nut mounted on said post to hold the same in fixed relation to said plate; a bracket plate adapted to be fixedly mounted on a routing machine to move therewith; a plurality of articulated plates operatively connecting said slotted plate and said bracket plate; means for locking the said plates in fixed relation; and means for reversing the operative position of said slotted plate for altering the adjusted area of said glass.

In testimony whereof I have signed my name to this specification in the presence of two subscribing witnesses.

JOHN W. NELSON.

Witnesses:
    FREDERIC E. MORITZ,
    HENRY H. MORITZ.